US008744634B2

(12) United States Patent
Purani et al.

(10) Patent No.: US 8,744,634 B2
(45) Date of Patent: Jun. 3, 2014

(54) SAFETY INSTRUMENTED SYSTEM (SIS) FOR A TURBINE SYSTEM

(75) Inventors: Hardik Ashok Purani, Houston, TX (US); Randall John Kleen, Channelview, TX (US); Tabrez Shakeel, Houston, TX (US); Shahriar Tymus, Houston, TX (US)

(73) Assignee: General Electric Company, Schenectady, NY (US)

( * ) Notice: Subject to any disclaimer, the term of this patent is extended or adjusted under 35 U.S.C. 154(b) by 323 days.

(21) Appl. No.: 12/950,909

(22) Filed: Nov. 19, 2010

(65) Prior Publication Data

US 2012/0130553 A1 May 24, 2012

(51) Int. Cl.
*G05D 13/00* (2006.01)

(52) U.S. Cl.
USPC .................. 700/287; 700/79; 700/2; 700/21; 700/4; 700/81; 700/82

(58) Field of Classification Search
None
See application file for complete search history.

(56) References Cited

U.S. PATENT DOCUMENTS

| | | | | |
|---|---|---|---|---|
| 3,911,286 A * | 10/1975 | Uram | ........................ | 290/40 R |
| 4,031,372 A * | 6/1977 | Davis | ............................ | 700/287 |
| 4,037,088 A * | 7/1977 | Davis et al. | .................... | 700/289 |
| 4,051,669 A * | 10/1977 | Yannone et al. | ................. | 60/773 |
| 4,274,255 A * | 6/1981 | Pollak | ............................. | 60/790 |
| 5,206,810 A | 4/1993 | Bools et al. | | |
| 5,270,917 A * | 12/1993 | Kimura | ........................... | 700/82 |
| 5,309,707 A * | 5/1994 | Provol et al. | .................... | 60/773 |
| 5,369,948 A * | 12/1994 | Vertens et al. | .................. | 60/778 |
| 6,567,709 B1 * | 5/2003 | Malm et al. | ...................... | 700/21 |
| 6,679,046 B2 * | 1/2004 | Tanaka et al. | .............. | 60/39.091 |
| 6,789,000 B1 * | 9/2004 | Munson, Jr. | ................... | 700/287 |
| 6,941,217 B1 * | 9/2005 | Munson, Jr. | ................... | 701/100 |
| 7,096,657 B2 | 8/2006 | Mahoney et al. | | |
| 7,100,378 B2 * | 9/2006 | Matthews | ....................... | 60/779 |
| 7,262,516 B2 | 8/2007 | Kleen | | |
| 7,471,005 B2 * | 12/2008 | Kleen | .......................... | 290/40 B |
| 7,715,932 B2 * | 5/2010 | Seizinger | ......................... | 700/79 |
| 7,745,948 B2 * | 6/2010 | Kerber | .............................. | 290/44 |
| 7,793,774 B2 * | 9/2010 | Cole et al. | ................ | 198/810.01 |
| 8,036,805 B2 * | 10/2011 | Mahoney et al. | ............. | 701/100 |
| 8,121,707 B2 * | 2/2012 | Karaffa et al. | ..................... | 700/8 |
| 8,151,572 B2 * | 4/2012 | Tanaka et al. | .................... | 60/778 |
| 2010/0061852 A1 * | 3/2010 | Potter et al. | ...................... | 416/31 |
| 2010/0275575 A1 * | 11/2010 | Brown | ............................. | 60/204 |

\* cited by examiner

*Primary Examiner* — Kavita Padmanabhan
*Assistant Examiner* — Christopher E Everett
(74) *Attorney, Agent, or Firm* — Fletcher Yoder, P.C.

(57) ABSTRACT

A retrofit kit for a turbine system is provided that includes a safety instrumented system (SIS) controller having a first plurality of functions and the SIS controller is configured to be coupled to a turbine-generator controller, wherein the SIS controller permits a startup function of the turbine-generator controller based on a plurality of inputs from a turbine.

18 Claims, 5 Drawing Sheets

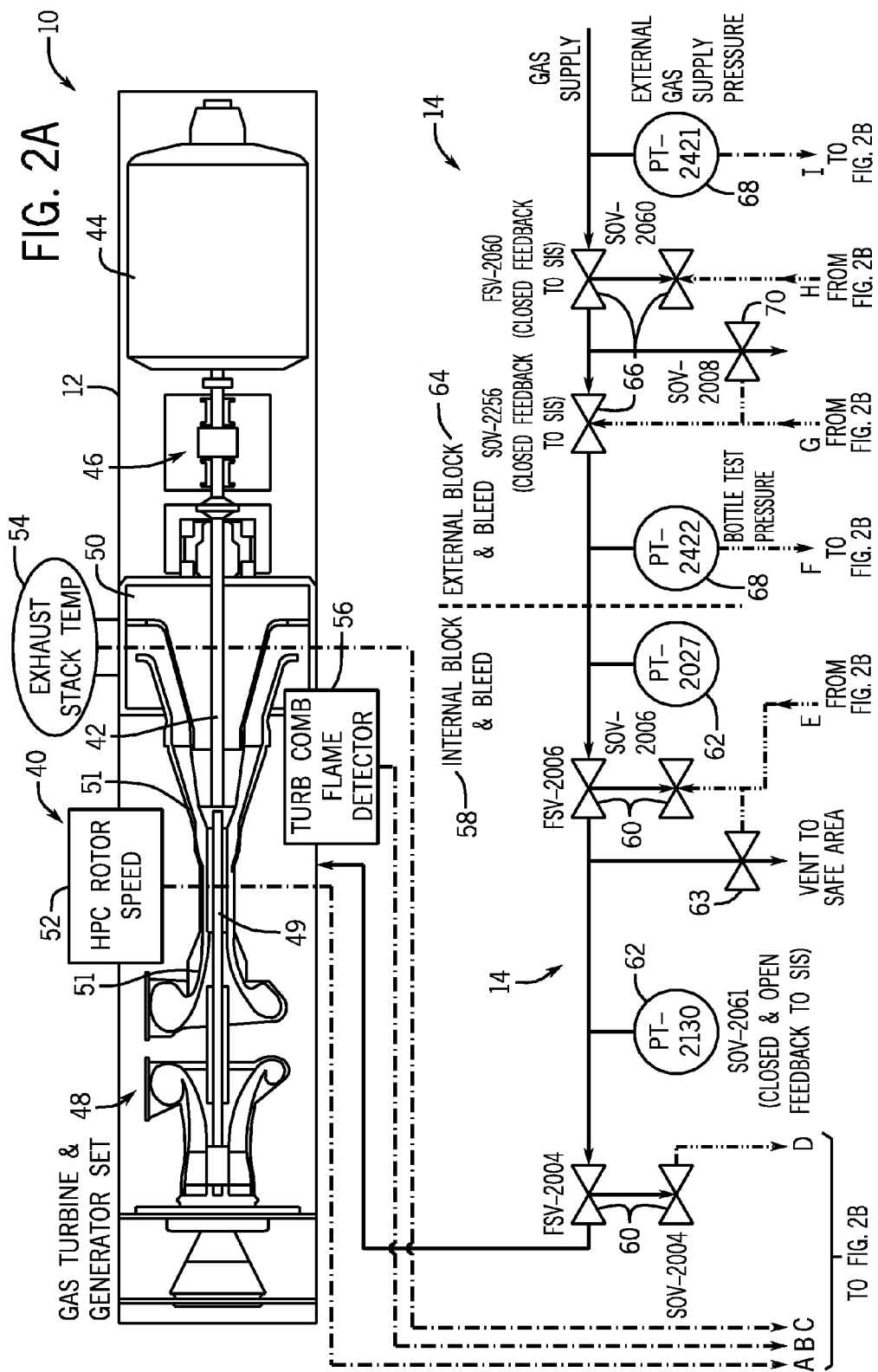

SAFETY INSTRUMENTED SYSTEM (SIS) FOR A TURBINE SYSTEM

BACKGROUND OF THE INVENTION

The subject matter disclosed herein relates to gas turbine systems and, more particularly, to control and monitor of such systems.

In general, gas turbine engines combust a mixture of compressed air and fuel to produce hot combustion gases. The gas turbine engines may be used, for example, for power generation such as by driving a generator. Such turbine generator systems may be coupled to a control system that includes a controller. Control systems for turbine generator systems may include logic to monitor and control the gas turbine system and associated components. The controller of the control system may implement a variety of functions for such monitoring and control, but may be limited to such functions because of cost and configurability.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine coupled to a generator, a turbine-generator controller having a first plurality of functions and coupled to the turbine, and a second controller having a second plurality of functions and coupled to the turbine and the turbine-generator controller, wherein the second plurality of functions includes at least one function different than the first plurality of functions, wherein the second controller is functionally independent from the turbine-generator controller.

In a second embodiment, a system include a controller having a processor, a memory coupled to the processor, and a first plurality of functions, wherein the first plurality of functions include monitoring initialization and startup of a turbine by a turbine-generator controller, wherein the controller is configured to couple to the turbine-generator controller and the turbine-generator controller comprises a second plurality of functions In a third embodiment, a retrofit kit includes a safety instrumented system (SIS) controller having a first plurality of functions, wherein the SIS controller is configured to be coupled to a turbine-generator controller, wherein the safety instrumented system controller permits a startup function of the turbine-generator controller based on a plurality of inputs.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIGS. 2A and 2B are block diagrams illustrating a detailed embodiment of the controllers of FIG. 1;

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present invention include a safety-instrument system (SIS) for a turbine system, e.g., a gas turbine, independent of the turbine-generator controller. The SIS includes a separate and functionally independent controller that implements a number of protection and safety functions using the same inputs available to the turbine-generator controller and other systems. The SIS may monitor completion of system initialization and startup, fuel system bottle test, enclosure purge, exhaust purge and light-off, operation monitoring, and shutdown. The SIS enables the turbine system to conform to industrial standards without modification or replacement of the turbine-generator controller.

Figure 1:
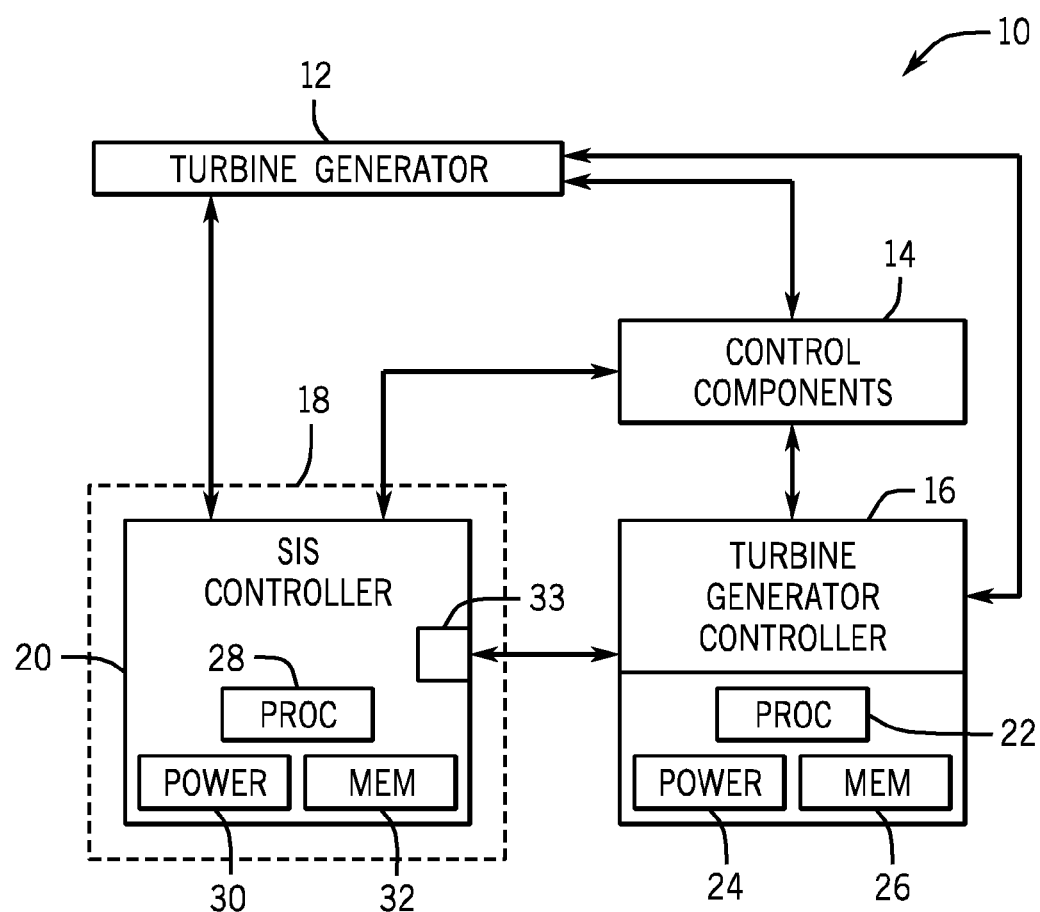
FIG. 1 is a block diagram illustrating an embodiment of a system having a turbine-generator controller and a safety instrumented system (SIS) controller.

FIG. 1 depicts a system 10 having a gas turbine generator system 12 (e.g., gas turbine engine coupled to an electrical generator) coupled to control components 14 and controlled by a turbine-generator controller 16. In certain embodiments, the system 10 may include a watercraft, a locomotive, a power generation system, or combinations thereof. The system 10 may include a safety instrument system 18 that includes the control components 14, the turbine-generator controller 16, and an SIS controller 20. In other embodiments, the system 10 may include a steam turbine and the following techniques may be implemented in a steam turbine system.

The control components 14 may include any suitable components for controlling and monitoring the turbine generator system 12. For example, the control components 14 may include valves, actuators, sensors, and other suitable components. The turbine-generator controller 16 may include a processor 22, a power source 24, and a memory 26. The memory 26 may be non-transitory computer-readable media and may include volatile memory, such as random access memory (RAM), and non-volatile memory, such as read only memory (ROM), flash memory, and magnetic storage devices (e.g., a hard drive). As shown in FIG. 1, the turbine-generator controller may receive data from the control components 14, the turbine generator system 12, and the SIS controller 20, and may output data to the control components 14 and the SIS controller 20.

The SIS controller 20 may include a processor 28, a power source 30, a memory 32, and a network interface 33. As noted above, the memory 32 may be non-transitory computer readable media and may include volatile memory, such as RAM, and non-volatile memory, such as ROM, flash memory, and magnetic storage device (e.g., a hard drive). As shown in FIG. 1, the SIS controller 20 may receive data from the control components 14, the turbine generator system 12, and the turbine-generator controller 16, and may output data to the control components 14 and the turbine-generator controller 16. The SIS controller 20 may implement the various functions described below using the inputs received from the control components 14, the turbine generator system 12, and the turbine-generator controller 16. Additionally, the SIS controller 20 may execute the various functions by outputting control data to the control components 14 and the turbine-generator controller 16. The SIS controller 20 may provide functions to conform to industrial standards for safety and redundancy while still allowing for use of the turbine-generator controller 16 includes in the system 10. As described further below, the functions provided by the SIS controller 20 may conform to various standards, such as International Electrotechnical Commission (IEC) 61508 for Functional Safety of Electrical/Electronic/Programmable Electronic Safety-related Systems, IEC 61522 for Functional Safety, Safety Instrumented Systems for the Process Sector, Standards Australia (AS) 3814 for Industrial and Commercial Gas-fired Applications, and Technischer Überwachungs-Verein (TUV) standards.

Figure 2B:
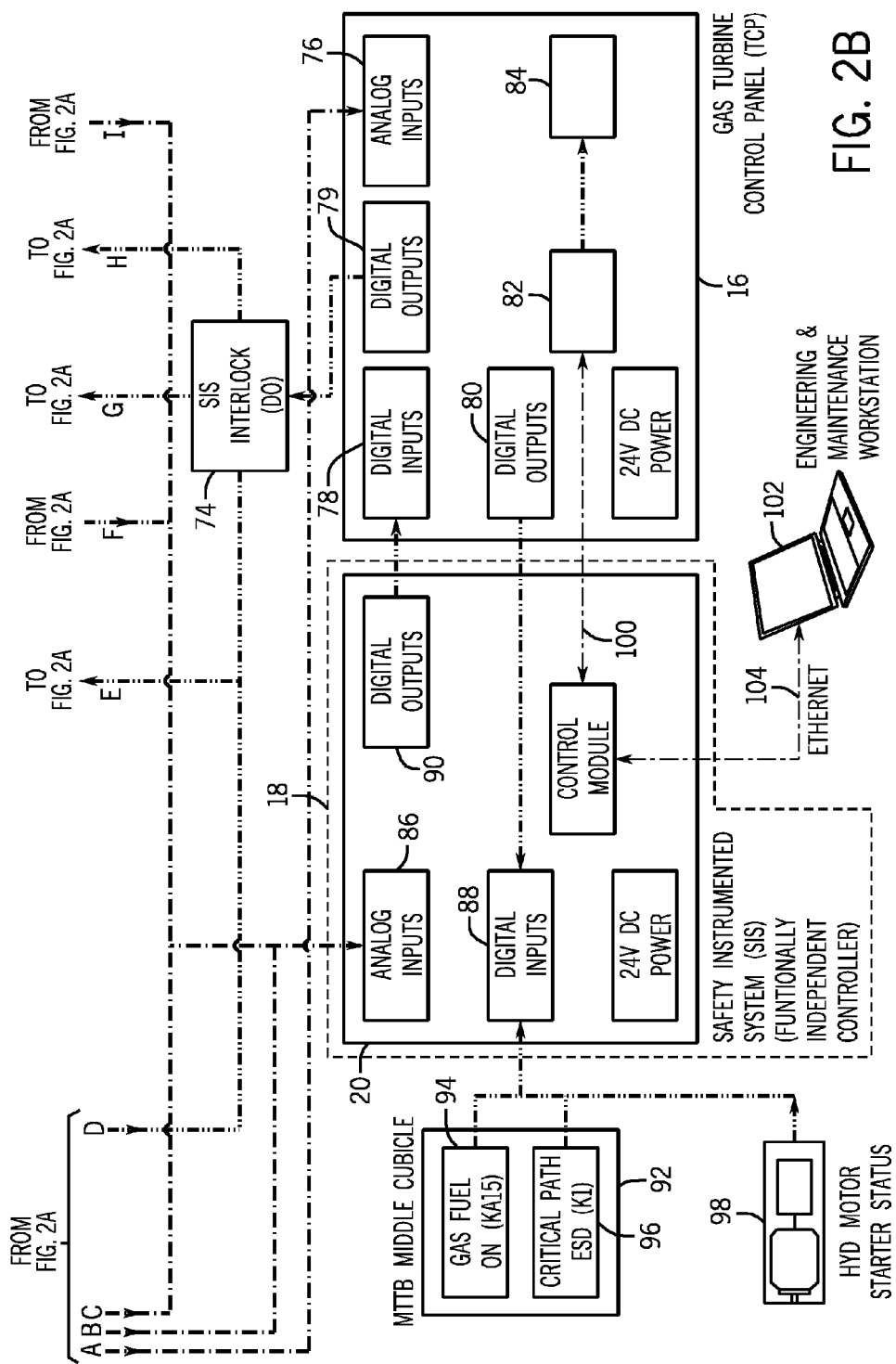

FIGS. 2A and 2B illustrates components of the system 10 in greater detail in accordance with certain embodiments of the present invention. As shown in FIG. 2A, the turbine generator system 12 may include for example, a gas turbine 40 having a shaft 42 that drives a generator 44 via a clutch and gearbox 46. The gas turbine 40 may include an intake section 48, a combustor section 49, an exhaust section 50, a compressor section 51, and other related components. The gas turbine 40 may include or be coupled various sensors to provide data outputs, such as compressor rotor speed 52, exhaust stack temperature 54, and a combustion flame detectors 56. In other embodiments, such sensors may include vibration, pressure, other temperatures (e.g., intake temperature), flow rate, emissions, etc.

The control components 14 may include various valves, sensors, and actuators to facilitate various operations of the turbine generator system 12. For example, the control components 14 may include an internal block and bleed system 58 that includes valves 60 and pressure sources 62. The valves 60 may be pneumatic, electric, manual, or a combination thereof. The internal block and bleed system 58 may include a vent valve 63 that vents to an appropriate area. Similarly, the control components 14 may also include an external block and bleed system 64 having valves 66 and pressure sources 68. The valves 66 may be pneumatic, electric, manual, or a combination thereof. The external block and bleed system 58 may also include a vent valve 70 to vent to an appropriate area. The control components 14 may also be coupled to a gas supply 72 for supplying pressure, purge gas, or both.

The turbine-generator controller 16 may be coupled to the control components 14 by an SIS interlock 74. The SIS interlock 74 may operate the control components 14 to the appropriate state in the event of a failure condition, such as loss of power or an emergency shutdown. The turbine-generator controller 16 may receive analog inputs 76 from various sources of the system 10, such as the rotor speed 52, the exhaust stack temperature 54, the combustion flame detection 56, pressure from pressure sources 62 and 68, etc. Additionally, the turbine-generator controller 16 may receive digital inputs 78 from the SIS controller 20, and may provide digital outputs 80 to the SIS controller 20. Additionally, the turbine-generator controller 16 may provide digital outputs 79 to the SIS interlock 74 for operation of the valves 60 and 66. As also shown in FIG. 2B, the turbine-generator controller 16 may include a control panel 82 and a network interface 84. The turbine-generator controller 16 may control the turbine generator system 12 based on the analog inputs 76 and provide control signals through the digital outputs 79.

The SIS controller 20 may receive analog inputs 86, digital inputs 88, and provide digital outputs 90. The SIS controller 20 is separate and functionally independent from the turbine-generator controller 16 but may use the same signal sources from the control components 14. As used herein, the term "functionally independent" describes a controller that may operate independently of the turbine-generator controller 16 and may include additional functions not provided by the turbine-generator controller 16. The system 10 may also include signal repeaters and converters to minimize signal attenuation. For example, the analog inputs 86 may include the rotor speed 52, the exhaust stack temperature 54, the combustion flame detection 56, pressure from pressure sources 62 and 68, etc. The SIS controller 20 may provide digital outputs 90 to the digital inputs 78 of the turbine-generator controller 16. For example, the SIS controller 20 may provide process data to the turbine-generator controller 16 and may enable the turbine-generator controller 16 to display SIS status and alarms on the controller 16. As described further below, the digital outputs 90 may be used for completion of shutdown and purges. The SIS controller 20 also receives digital inputs 88 from the digital outputs 80 from the turbine-generator controller 16. The SIS controller 20 may monitor the turbine generator system 12 based on the analog inputs 86 and execute safety functions based on the status of the turbine generator system 12 and the control components 14. Based on this data, the SIS controller 20 may permit the turbine-generator controller 16 to execute functions (e.g., startup of the turbine generator system 12) or may shutdown such functions if certain conditions are detected. Thus, the SIS controller 20 implements functionally independent monitoring of the system 10 based on the available inputs from the turbine generator 12 and the control components 14.

Additionally, the SIS controller 20 may be coupled to a control cubicle 92 that includes a gas fuel relay 94 and critical path emergency shutdown (ESD) 96. The control cubicle 92 may be coupled to a motor starter 98. Indicators for the gas fuel relay 94 and ESD 96 may be provided to the SIS controller 20 as digital inputs 88.

Further, the SIS controller 20 may communicate with the control panel 82 of the turbine-generator controller 16 through a connection 100 over any suitable protocol, such as over a serial port using ModBus RTU serial or Ethernet. Finally, the SIS controller 20 may be coupled to a personal computer 102, such as a laptop, desktop, etc. over any suitable connection 104, such as Ethernet. The personal computer 102 may be used to configure and monitor the SIS controller 20.

Figure 3:
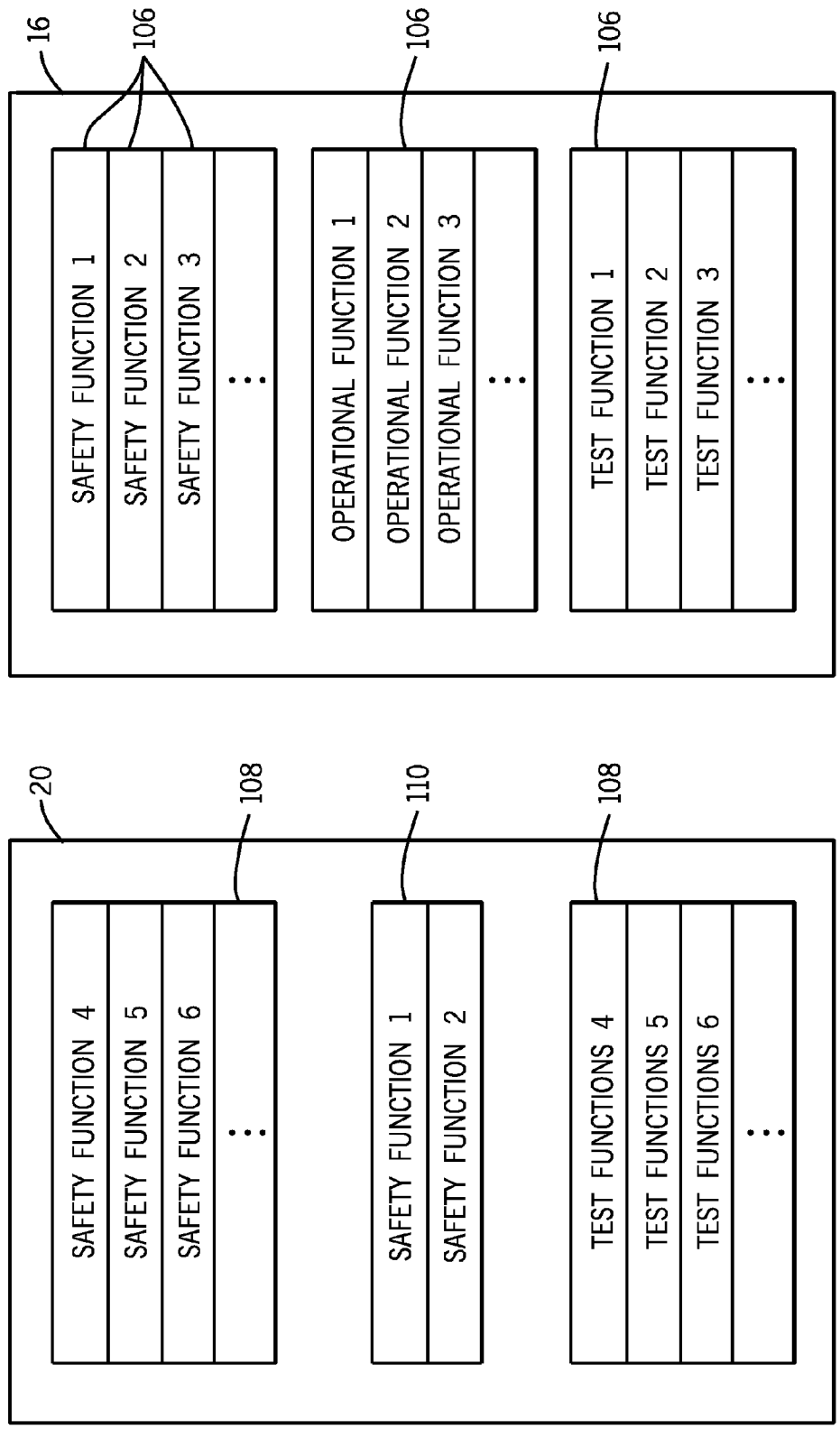
FIG. 3 is a block diagram illustrating an embodiment of a turbine-generator controller and an SIS controller.

As mentioned above, the SIS controller 20 of the SIS 18 may provide additional safety functions, redundant safety functions, or both, to an existing turbine-generator controller 16. For example, the SIS controller 20 may be a retrofit kit that may be retrofitted to an existing system having a turbine system and turbine-generator controller. FIG. 3 illustrates the functionally independent features of the additional SIS controller 20 when coupled to an existing turbine-generator controller 16 in accordance with an embodiment of the present invention. As shown in FIG. 3, the turbine-generator controller 16 may include functions 106, such as operational functions 1, 2, 3, etc., safety functions 1, 2, 3, etc., and test functions 1, 2, 3, etc. When added to the system 10, the SIS controller 20 may add additional functions 108, such as safety functions 4, 5, 6 and test functions 4, 5, 6. Additionally, the SIS controller 20 may add redundant functions 110, such as safety functions 1 and 2 or any other functions redundant to the functions 106 present on the turbine-generator controller 16. As described above, the functions 108 and 100 may execute based on the analog inputs 86 received from the system 10 and also utilized by the turbine generator controller 16. The functions 108 and 110 may be added to conform to standards without modification or replacement of the turbine-generator controller 16. For example, in one embodiment, the functions 108 and 110 added by the SIS controller 20 may conform to IEC 61508, IEC 61511, and AS 3814.

Figure 4:
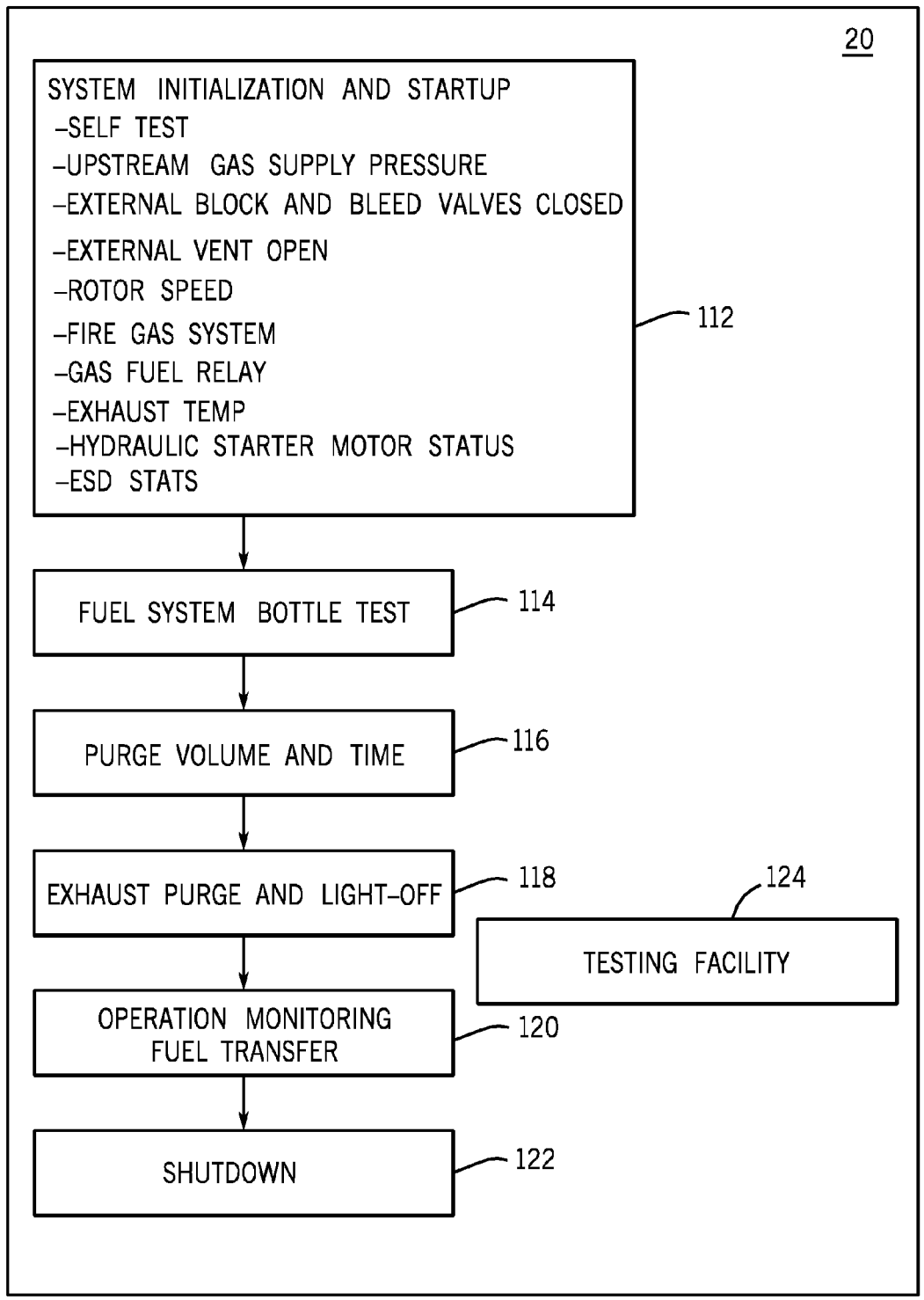
FIG. 4 is a block diagram illustrating the functions of an embodiment of an SIS controller.

FIG. 4 depicts various functions implemented on an embodiment of the SIS controller 20. The embodiment depicted in FIG. 4 illustrates functions that may be implemented to conform to Safety Instrumental Level (SIL) standards, such as IEC 61508, IEC 61611, and AS 3814. In such an embodiment, the SIS controller 20 may perform such functions based on the digital inputs 90 and analog inputs 86 and provide the digital outputs 90 described above and illustrated in FIGS. 2A and 2B.

As shown in FIG. 4, the controller 20 may include a system initialization and startup function 112. The SIS controller 20 may receive a start command (digital inputs 88) from the turbine-generator controller 16, such as from a local or remote start command initiated on the turbine-generator controller 16. The SIS controller 20 may perform a self-test to ensure all internal components, inputs, and outputs are functioning properly. The self-test may also include pressuring the lines up to the external block and bleed valves 66. Additionally, in some embodiments, the SIS controller 20 may include a local start button that may be used to activate the self-test function. Further, in other embodiments, the self-test of the SIS controller 20 may be manually initiated by an operator from the turbine-generator controller 16.

After the completing the self-test, the SIS controller 20 may permit startup of the turbine generator 12 by sending a signal to the turbine-generator controller 16 (referred to as a "Start Permissive" signal). The SIS controller 20 may actively monitor and control safety functions of gas fuel operation during startup. For example, the "Start Permissive" signal may be based on various conditions detected by the SIS controller 20. As shown in FIG. 4, such conditions may include checking for successful completion of the self-test, upstream gas supply pressure, closing of the external block and bleed valves 66, opening of the external vent valve 70, rotor speed, fire gas system, gas fuel relay 94, exhaust temperature, status of the hydraulic starter motor 98, and status of a turbine generator emergency shutdown (ESD). After the startup signal is provide to the turbine-generator controller 16, the turbine-generator controller 16 may initiate an auxiliary system check and perform an enclosure purge. If the SIS controller 20 detects a system fault during the initialization, the SIS controller 20 may send an emergency shutdown signal to the turbine-generator controller 16. In such an emergency shutdown, the SIS controller 20 may close the external block and bleed valves 66 and open the external vent valve 70, disable the internal block and bleed valves 60, and send the appropriate signal to the turbine-generator controller 16.

The SIS controller 20 also monitors successful completion of a fuel system bottle test (block 114) and an enclosure purge volume and time (block 116). The fuel system bottle test 114 may include testing of the external block and bleed valves 66 and the external vent valve 70, and testing of the pressure sources 68. If the fuel system bottle test 114 or the enclosure purge volume and time 116 do not complete successfully then, the SIS controller 20 may abort startup of the turbine generator system 12.

After successful completion of the fuel system bottle test 114 and enclosure purge 116, the SIS controller 20 permits the turbine-generator controller 16 to initiate startup and perform an exhaust purge and light-off 118 of the turbine generator system 12. The SIS controller 20 may monitor the exhaust purge and light-off 118. During the exhaust purge, the SIS controller 20 may monitor the status of the hydraulic starter motor 98 and may monitor compressor speeds to ensure sufficient rotor speeds are reached within specific durations. If these conditions are not met, the SIS controller 20 may abort startup of the turbine generator system 12.

After completion of the exhaust purge, the turbine-generator controller 16 may start the igniter of the gas turbine 40 and the SIS controller 20 may provide a signal to turn on the gas fuel. The SIS controller 20 may monitor gas fuel (e.g., gas fuel relay 94) and the flame detectors 56. For example, the SIS controller 20 may wait to receive an indication that the gas fuel is on. If no such indication is received, the SIS controller 20 may abort startup and close the external block and bleed valves 66. The SIS controller 20 may monitor the flame detectors 56 and abort startup if no flame is detected from any detector within a specific duration. Additionally, if the SIS controller 20 receives any indication of flame from the flame detectors 56 without receiving the corresponding gas fuel indicator, the SIS controller 20 may abort the startup. Additionally, the SIS controller 20 may send an emergency shutdown signal to the turbine-generator controller 16 if all flame detectors 56 are lost (e.g., if no signal is received from the flame detectors 56).

Additionally, the SIS controller 20 includes an operation monitoring function 120 to monitor operation of the turbine generator system 12. The SIS controller 20 may abort operation of the system by sending an emergency shutdown signal to the turbine-generator controller 16 if various conditions occur. Such conditions may include, for example, a fire or gas leak, activation of the turbine system emergency shutdown, turbine exhaust temperature above a set point, loss of gas fuel indicator, gas supply pressure above a first threshold or below a second threshold, compressor speed above a set point, compressor below the set points during purge, fuel system bottle test failure, and/or failure of external block and bleed valves 66 and vent valve 70 (e.g., command vs. position feedback error.)

Finally, the SIS controller 20 may also include a shutdown function 122 to monitor shutdown of the turbine generator system 12. During shutdown, the SIS controller 20 may monitor the conditions described above during operation monitoring. The shutdown function 122 may also include closing of the external block and bleed valves 66 and the external vent valve 70, and then reopening of the external vent valve 70 and the external block and bleed valves 66 to vent trapped gas fuel.

Additionally, some embodiments may include a testing facility 124 to provide for routine off-line testing of the safety functions without software and hardware simulations being required. For example, the testing facility 124 may be selected to test each of the functions of the controller 20. When a specific function is selected for testing, the testing facility may apply the logic pre-conditions to allow the full testing of the function. The test facility 124 for each safety function may be manually reset or automatically reset to a safe in-service state after a specific duration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a turbine coupled to a generator, wherein the turbine has at least one input fluid flow and at least one output fluid flow;
   a turbine-generator controller comprising a first plurality of functions and coupled to the turbine, wherein the turbine-generator controller controls operation of the turbine, and the first plurality of functions comprises a shutdown function and a startup function for the turbine; and
   a second controller comprising a second plurality of functions and coupled to the turbine and the turbine-generator controller, wherein the second controller is configured to control the turbine-generator controller with at least one function of the second plurality of functions that is different than the first plurality of functions, wherein the second controller is functionally independent from the turbine-generator controller, wherein the first and second pluralities of functions each include control functions to control the at least one input fluid flow or the at least one output fluid flow, wherein the at least one function of the second plurality of functions comprises at least one startup permitting function that permits the turbine-generator controller to startup the turbine, a shutdown causing function that causes the turbine-generator controller to shutdown the turbine, or a combination thereof.

2. The system of claim 1, wherein the second controller comprises a safety instrumented system (SIS) controller.

3. The system of claim 1, wherein the second plurality of functions comprises monitoring the startup function of the turbine-generator controller.

4. The system of claim 1, wherein the second controller sends an emergency shutdown signal to the turbine-generator controller based on the plurality of conditions.

5. The system of claim 4, wherein the plurality of conditions comprises completion of a self-test of the second controller.

6. The system of claim 4, wherein the plurality of conditions comprises monitoring of a valve coupled to the turbine, a rotor speed of a compressor of the turbine, exhaust temperature of the turbine, and status of an emergency shutdown of the turbine.

7. The system of claim 1, wherein the turbine comprises a gas turbine.

8. The system of claim 1, wherein the second controller comprises a testing facility that provides testing of each of the second plurality of functions.

9. A system, comprising:
   a controller, comprising:
      a processor;
      a memory coupled to the processor, and
      a first plurality of functions, wherein at least one function of the first plurality of functions comprises monitoring initialization and permitting startup of a turbine by a turbine-generator controller if a set of conditions are met or blocking startup if the set of conditions are not met, wherein the controller is configured to couple to the turbine-generator controller and the turbine-generator controller comprises a second plurality of functions, and the at least one function of the first plurality of functions is different from the second plurality of functions to enable the controller to control the turbine-generator controller, wherein the turbine-generator controller controls the turbine using the second plurality of functions, wherein the second plurality of functions comprises a startup function and a shutdown function for the turbine.

10. The system of claim 9, wherein the first plurality of functions comprise monitoring a fuel system monitoring function of the turbine-generator controller, and an exhaust purge and light-off function of the turbine-generator controller.

11. The system of claim 9, wherein the controller and the turbine-generator controller receive a plurality of inputs from the turbine.

12. The system of claim 9, wherein the plurality of inputs comprise a rotor speed of the compressor of the turbine, a flame detector of the turbine, and an exhaust temperature of the turbine.

13. The system of claim 9, comprising a plurality of outputs coupled to a plurality of control components coupled to the turbine, wherein the control components comprise a plurality of valves.

14. A system comprising:
   a retrofit kit for a turbine-generator system, comprising:
      a safety instrumented system (SIS) controller having a first plurality of functions, wherein the SIS controller is configured to be coupled to a turbine-generator controller having a second plurality of functions, the SIS controller conditionally permits or blocks a startup function of the turbine-generator controller based on a plurality of inputs from a turbine, and at least one function of the first plurality of functions is different from the second plurality of functions to enable the SIS controller to control the turbine-generator system via the turbine-generator controller, wherein the turbine-generator controller controls the turbine using the second plurality of functions, wherein the second plurality of functions comprises a startup function and a shutdown function for the turbine.

15. The system of claim 14, wherein the startup function of the turbine-generator controller starts operation of the turbine coupled to the SIS controller and the turbine-generator controller.

16. The system of claim 15, wherein the plurality of inputs comprise a fuel operation, a rotor speed of a compressor of the turbine, an exhaust temperature of the turbine, a flame detection of the turbine, and a status of an emergency shutdown of the turbine.

17. The system of claim 14, wherein the SIS controller comprises a network connection coupled to the turbine-generator controller.

18. The system of claim 14, wherein the first plurality of functions conform to International Electrotechnical Commission (IEC) 61508, IEC 61522, and Standards Australia (AS) 3814.

* * * * *